UNITED STATES PATENT OFFICE.

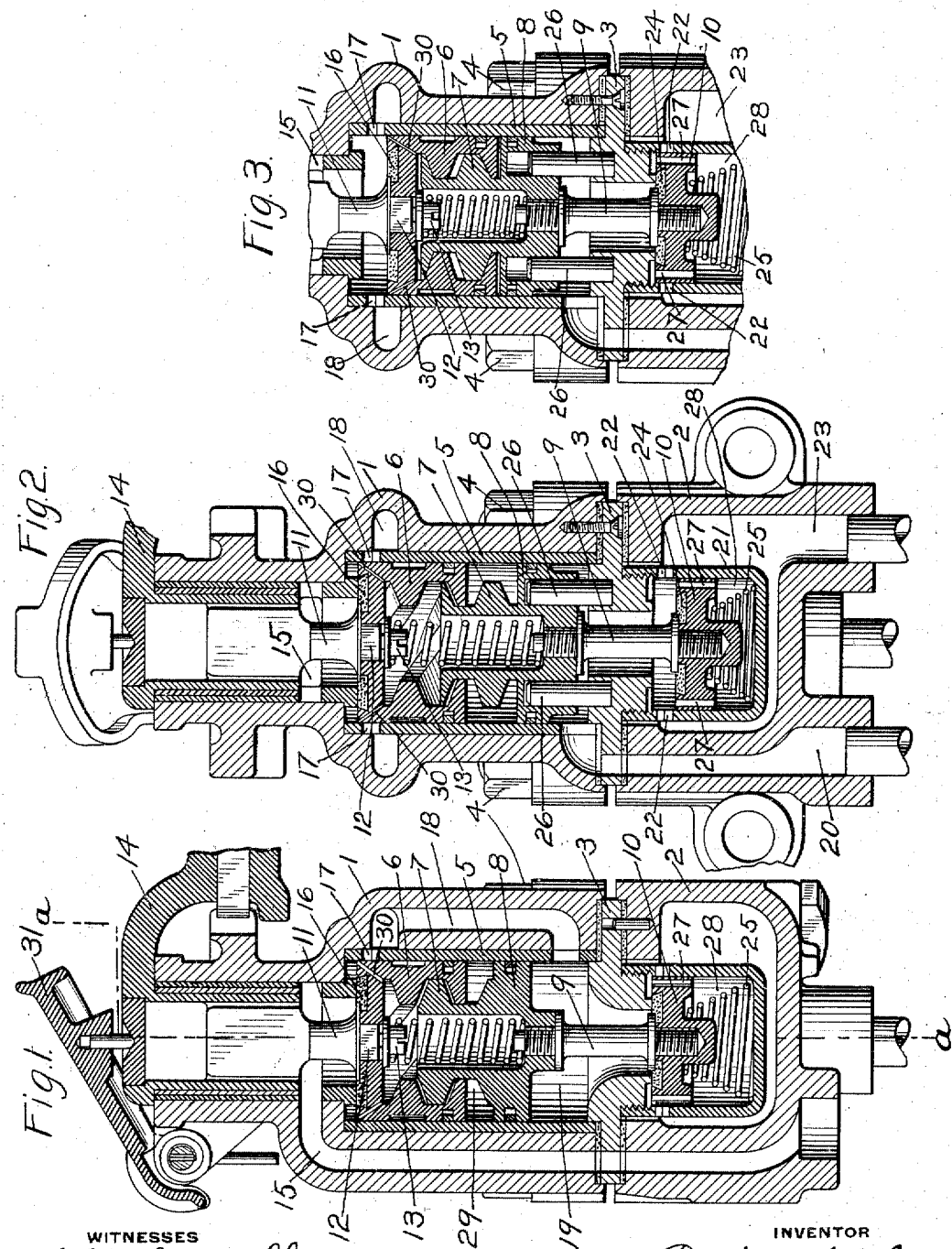

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

BRAKE-VALVE DEVICE.

1,255,844.  Specification of Letters Patent.  Patented Feb. 12, 1918.

Application filed March 16, 1915. Serial No. 14,630.

*To all whom it may concern:*

Be it known that I, BURTON S. AIKMAN, a citizen of the United States, residing at Milwaukee, in the county of Milwaukee and State of Wisconsin, have invented new and useful Improvements in Brake-Valve Devices, of which the following is a specification.

This invention relates to fluid pressure brakes, and more particularly to a brake valve for straight air brake service.

One object of my invention is to provide an improved brake valve having valves of the sliding piston type.

Another object is to provide a self closing cap for preventing the entrance of dirt into the brake valve when the handle is removed and also adapted to prevent the soiling of clothing in case of contact with the brake valve.

Another object is to provide a generally improved straight air brake valve.

Other objects and advantages will appear in the following more detailed description of the invention.

In the accompanying drawing; Figure 1 is a central vertical section of a brake valve embodying my improvements, with the parts in lap position; Fig. 2 a central vertical section of the brake valve taken on the line a—a of Fig. 1, showing the parts in brake application position; and Fig. 3 a fragmentary sectional view, on the same plane as Fig. 2, showing the parts in release position.

According to my invention, the brake valve preferably comprises a main casing 1, a pipe bracket 2, and an intermediate section 3, all adapted to be clamped together by means of tie bolts 4, so that the main casing may be taken off by removing the tie bolts, thus permitting change of valve or the like, without disturbing the pipe connections.

The main casing has a piston chamber containing a bushing 5 within which is mounted a release piston valve 6 interiorly threaded for a coarse pitch screw 7 having a piston head 8 reciprocating in the bushing 5 and provided with a downwardly extending stem 9, to which is secured an admission piston valve 10.

A handle stem 11 is provided with a rectangular projection 12 fitting a corresponding aperture in the exhaust valve 6, the stem 11 being clamped to the exhaust valve by a bolt 13.

The upper end of the stem 11 is made flat, and the brake valve handle 14 is provided with a corresponding recess. The handle, when in position, being adapted to bear on the top portion of the casing 1, so that no pressure can be applied to the stem by downward movement of the handle.

The chamber above the exhaust valve 6 is open to atmospheric exhaust passage 15 and the exhaust valve is provided with a leather seat 16 adapted to prevent leakage when the valve is in closed position.

The exhaust valve 6 controls exhaust ports 17 in the bushing 5, which open into a cavity 18 which leads to chamber 19 below the piston head 8, said chamber being connected to brake cylinder passage 20.

The admission valve 10 is mounted within a closed end bushing 21 secured to the section 3 and provided with ports 22 controlled by the movement of the piston valve 10 and adapted to supply fluid under pressure from the main reservoir supply chamber 23 to the space above the valve 10.

The admission valve 10 is provided with preferably a leather seat 24 adapted to prevent leakage in the closed position of the valve, and a light coil spring 25 acts on the valve and tends to hold same in the seated position.

In operation, fluid under pressure from the main reservoir being supplied to the chamber 23, with the parts in lap position, as shown in Fig. 1 of the drawing, the admission valve 10 is seated, so that there can be no escape of fluid from chamber 23.

If it is desired to apply the brakes, the brake valve handle 14 is moved to the right from lap or center position, thereby imparting a rotary movement to the exhaust valve 6.

Since the thread in the exhaust valve is right handed, there is a tendency for the valve to move upwardly on the screw 7, but since upward movement thereof is prevented by the seating of the exhaust valve, the screw 7 will be moved downwardly, rotative movement being prevented by the stationary pins 26 secured to the section 3 and mounted in corresponding recesses in the piston head 8.

The admission valve 10 is thus moved from its seat. Ports 27 through the valve 10 now permit any fluid in chamber 28 to escape into chamber 19, so that the fluid pressure on opposite sides of the valve piston will be automatically balanced.

Further movement of the piston valve 10 will uncover the ports 22, thus permitting flow of fluid from the main reservoir chamber 23 to the chamber 19 and the brake cylinder, the flow corresponding with the amount of port area uncovered by the movement of the valve. If the brake valve handle is moved to the extreme right hand position, the ports 22 are fully opened and supply of fluid to the brake cylinder takes place in the shortest time possible.

When the desired pressure is attained in the brake cylinder, the brake valve handle is moved to lap position, seating the admission valve 10.

In order to release the brakes, the brake valve handle is moved to the left from lap position and since the screw 7 is prevented from further upward movement by the seating of the piston valve 10, the exhaust valve 6 will be moved downwardly away from its seat. Fluid in chamber 29 is then allowed to escape through ports 30 in the exhaust valve 6 to exhaust passage 15, so as to automatically balance the fluid pressures on opposite sides of the valve.

Further movement of the exhaust piston valve 6 will open the ports 17, permitting the escape of fluid from the brake cylinder to the atmosphere through cavity 18 and ports 17 to atmospheric exhaust passage 15.

The rate of exhaust from the brake cylinder may be varied according to the extent to which the ports 17 are uncovered and when the brake valve handle is turned to the extreme left hand position, the ports 17 are fully opened, thus permitting the exhaust of fluid from the brake cylinder in the shortest possible time.

In order to prevent dirt and dust from entering the bearings, a self closing cap 31 is provided, which is hinged to the top of the casing 1 and is adapted to automatically close the handle opening in the brake valve casing when the handle is removed.

This cap also acts as a guard to prevent passengers' clothing from coming in contact with any oil or grease which might be present on the upper portion of the brake valve casing.

Having now described my invention, what I claim as new and desire to secure by Letters Patent is:

1. A brake valve comprising a casing, a piston valve for controlling the supply of fluid under pressure to the brake cylinder, a piston valve for controlling the exhaust of fluid from the brake cylinder, a handle for rotating the exhaust valve, and a screw carried by the admission valve and having screw threaded engagement with the exhaust valve, said valves being adapted to unseat upon initial movement in one direction and upon further movement to open ports controlled by the periphery of the piston valve.

2. A brake valve comprising a casing, a non-rotatable piston valve mounted therein and having a plane seat for controlling the admission of fluid under pressure to the brake cylinder, a piston valve having a plane seat for controlling the exhaust of fluid from the brake cylinder, a handle for rotating the exhaust valve and a screw secured to the admission valve and having screw-threaded engagement with the exhaust valve, said piston valves controlling peripheral ports through which the admission and release of fluid to and from the brake cylinder is effected.

3. The combination with a brake valve having a removable handle and an opening for applying the handle to the brake valve, of a cap for closing the opening upon removal of the handle and adapted to engage the handle when in the operating position, to act as a shield.

4. The combination with a brake valve having a removable handle and an opening therein for inserting the handle, of a self-closing cap for covering the opening upon removal of the handle and adapted to cover the inserted portion of the brake valve handle when in the operating position.

In testimony whereof I have hereunto set my hand.

BURTON S. AIKMAN.

Witnesses:
J. E. HUBEL,
W. K. BOYLE.

Copies of this patent may be obtained for five cents each, by addressing the "Commissioner of Patents, Washington, D. C."